US012754340B2

(12) United States Patent
Wu et al.

(10) Patent No.: US 12,754,340 B2
(45) Date of Patent: Oct. 6, 2026

(54) METHODS TO PERFORM JOINT INVERSION OF FORMATION DATA AND JOINT INVERSION SYSTEMS

(71) Applicant: Halliburton Energy Services, Inc., Houston, TX (US)

(72) Inventors: Hsu-Hsiang Wu, Houston, TX (US); Ting Yan, Houston, TX (US); Dagang Wu, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 401 days.

(21) Appl. No.: 18/403,638

(22) Filed: Jan. 3, 2024

(65) Prior Publication Data

US 2025/0216574 A1 Jul. 3, 2025

(51) Int. Cl.
*G01V 3/20* (2006.01)
*E21B 49/00* (2006.01)

(52) U.S. Cl.
CPC ................ *G01V 3/20* (2013.01); *E21B 49/00* (2013.01)

(58) Field of Classification Search
CPC .................................. G01V 3/20; E21B 49/00
See application file for complete search history.

(56) References Cited

U.S. PATENT DOCUMENTS 11,299,978 B2 4/2022 Song et al.
2014/0163888 A1* 6/2014 Bowler .................. G01V 11/00 703/2
2014/0257703 A1 9/2014 Wu et al.
2014/0350859 A1 11/2014 Lin et al.
2016/0291195 A1 10/2016 Wu et al.
2021/0239872 A1 8/2021 Wheelock et al.

FOREIGN PATENT DOCUMENTS

WO 2005119298 A2 10/2005
WO 2018144029 A1 8/2018

OTHER PUBLICATIONS

International Search Report and Written Opinion for PCT/US2024/011125, mailed Sep. 30, 2024.

* cited by examiner

*Primary Examiner* — Walter L Lindsay, Jr.
*Assistant Examiner* — Geoffrey T Evans
(74) *Attorney, Agent, or Firm* — DeLizio, Peacock, Lewin and Guerra, LLP

(57) ABSTRACT

A computer-implemented method to perform joint inversion of formation data includes performing a first inversion of a formation surrounding a wellbore at a first frequency/spacing configuration, and performing a second inversion of the formation at a second frequency/spacing configuration that is different from the first configuration. The method also includes assigning a first fluctuating weight to the first inversion, and assigning a second fluctuating weight to the second inversion. The method further includes merging the first and second inversion based on a combination of the first and second fluctuating weights.

20 Claims, 9 Drawing Sheets

METHODS TO PERFORM JOINT INVERSION OF FORMATION DATA AND JOINT INVERSION SYSTEMS

BACKGROUND

The present disclosure relates generally to methods to perform joint inversion of formation data and joint inversion systems.

Inversions of well-log data obtained from logging tools, such as resistivity tools, are sometimes utilized to provide formation models for geographical interpretation of a formation. A joint inversion process, where different inversions (e.g., 1D inversion results) from different spacing and/or different operating frequencies are combined, is sometimes performed to improve the quality of the generated formation models. However, the measurement accuracies of different inversions used in the joint inversion process may differ from each other. Further, different inversions may have different effective models from different spacing/frequency measurements. As a result, a joint inversion process based on multiple frequency and multiple spacing measurements may not be able to produce better inversion results compared to individual inversion results based on specific frequency and transmitter-receiver (T-R) spacing.

BRIEF DESCRIPTION OF THE DRAWINGS

Illustrative embodiments of the present disclosure are described in detail below with reference to the attached drawing figures, which are incorporated by reference herein, and wherein.

Figure 1:
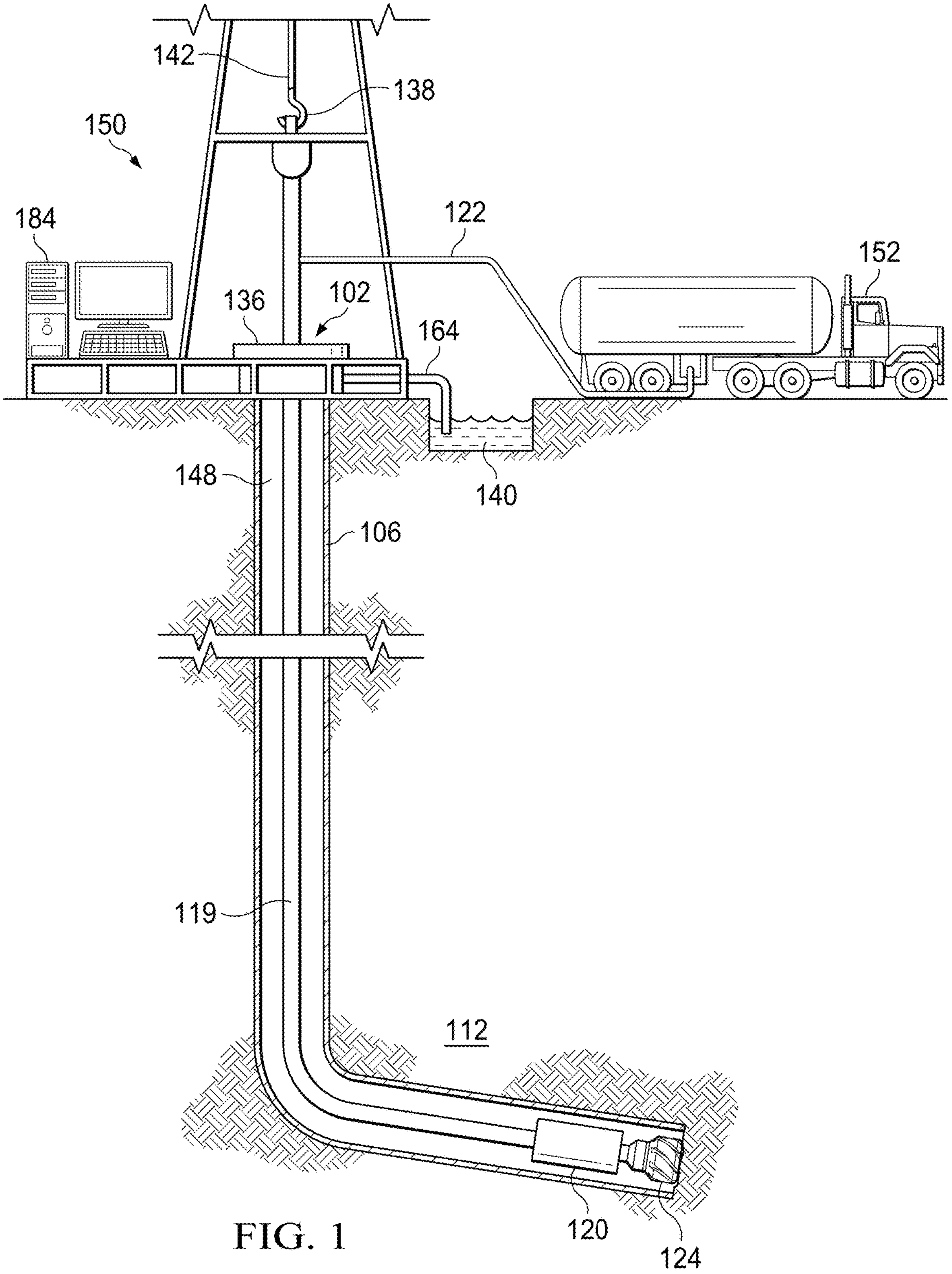
FIG. 1 is a schematic, side view of a logging while drilling (LWD)/measurement while drilling (MWD) environment where a joint inversion system is deployed.

The illustrated figures are only exemplary and are not intended to assert or imply any limitation with regard to the environment, architecture, design, or process in which different embodiments may be implemented.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid details not necessary to enable those skilled in the art to practice the embodiments described herein, the description may omit certain information known to those skilled in the art. Therefore, the following detailed description is not to be taken in a limiting sense, and the scope of the illustrative embodiments is defined only by the appended claims.

The present disclosure relates to methods to perform joint inversion of formation data and joint inversion systems. A joint inversion system described herein obtains well log data, surface seismic data, vertical seismic profiles, and other data indicative of a formation (collectively "formation data") generated by resistivity tools and other downhole tools (collectively "logging tools") operating at different frequencies and/or having different T-R spacing. The joint inversion system performs multiple inversion operations, where each inversion operation focuses on formation data indicative of the formation within a threshold distance range (e.g., distance to bed boundary ("DTBB")), and merges the multiple inversions into a single joint inversion. More particularly, the joint inversion system performs a first inversion from a first set of formation data indicative of the formation, where the first set of formation data is obtained by a logging tool at a first frequency. The joint inversion system also performs a second inversion from a second set of formation data indicative of the formation, where the second set of formation data is obtained by a logging tool at a second frequency. For example, the joint inversion system performs a first inversion based on formation data obtained by a formation tool operating at 1 kHz at a T-R spacing of 100 feet and performs a second inversion based on formation data obtained by the formation tool operating at 10 kHz at a T-R spacing of 100 feet. In some embodiments, the formation tool operates at the same frequency but different T-R spacing, different frequencies at the same T-R spacing, or at different combinations of frequencies and/or T-R spacing. In some embodiments, the joint inversion system performs additional inversions from additional sets of formation data, where the additional sets of formation data are obtained by the logging tool operating at additional frequencies. For example, the joint inversion system performs a third inversion based on formation data obtained by a formation tool operating at 20 kHz at a T-R spacing of 100 feet, and performs a fourth inversion based on formation data obtained by the formation tool operating at 30 kHz at a T-R spacing of 100 feet. In some embodiments, the first inversion is obtained by the logging tool operating at multiple different frequencies and/or having different T-R spacing. Similarly, in some embodiments, the second inversion is obtained by the logging tool operating at multiple different frequencies and/or having different T-R spacing. For example, the joint inversion system performs the first inversion based on formation data obtained by a formation tool operating at 1 kHz and 2 kHz at a T-R spacing of 100 feet and at 2 kHz and 4 kHz at a T-R spacing of 50 feet. Similarly, the joint inversion system performs a second inversion based on formation data obtained by the formation tool operating at 10 kHz and 20 kHz at a T-R spacing of 100 feet and at 20 kHz and 40 kHz at a T-R spacing of 50 feet.

The joint inversion system assigns different fluctuating weights to different inversions to account for their sensitivities and accuracies at different distances from the logging tool/wellbore. More particularly, the joint inversion system assigns a first fluctuating weight to the first inversion, and assigns a second fluctuating weight to the second inversion. For example, where the first inversion is based on formation data obtained at a higher frequency (or higher than a first threshold frequency), the joint inversion system assigns a higher weight to values associated with the first inversion within a first threshold distance (e.g., within a first distance range from the logging tool/wellbore, distance to a boundary, DTBB range, or another threshold distance or range) than values associated with the first inversion outside of the first threshold distance. Similarly, where the second inversion is based on formation data obtained at a lower frequency (or lower than a second threshold frequency that is lower than the first frequency), the joint inversion system assigns a higher weight to values associated with the second inversion outside of a second threshold distance (e.g., outside of a second distance range from the logging tool/wellbore, distance to a boundary, DTBB range, or another threshold distance or range), and a lower weight to values associated with the second inversion outside of the within the second threshold distance. Continuing with the foregoing example, where the first inversion is based on formation data obtained by a formation tool operating at 1 kHz and 2 kHz at a T-R spacing of 100 feet and at 2 kHz and 4 kHz at a T-R spacing of 50 feet, the joint inversion system assigns a weight of 0.1 to any point of interest of the formation that is within one meter of a boundary, 0.5 to any point between one meter and three meters of the boundary, and 0.9 to any point further than three meters of the boundary. Similarly, where the second inversion is based on formation data obtained by a formation tool operating at 10 kHz and 20 kHz at a T-R spacing of 100 feet and at 20 kHz and 40 kHz at a T-R spacing of 50 feet, the joint inversion system assigns a weight of 0.9 to any point of interest of the formation that is within one meter of a boundary, 0.5 to any point between one meter and three meters of the boundary, and 0.1 to any point further than three meters of the boundary.

In some embodiments, where the joint inversion system performs additional inversions, the joint inversion system also assigns additional fluctuating weights to each of the additional inversions. Additional descriptions of different inversions assigned to different fluctuating weights are provided herein, illustrated in at least FIGS. 4A and 4B.

In some embodiments, the joint inversion system determines an uncertainty of the accuracy of the first inversion (first uncertainty), and assigns the first fluctuating weight based on the first uncertainty. Similarly, the joint inversion system also determines an uncertainty of the accuracy of the second inversion (second uncertainty), and assigns the second fluctuating weight based on the second uncertainty. In one or more of such embodiments, the first and second uncertainty are values or functions that increase or decrease as a function of the distance from two different points of interest (e.g., from the point of interest to a boundary or another point of interest). For example, the first uncertainty decreases as the distance from a point of interest of the formation to a boundary decreases, and increases as the distance increases. The second uncertainty increases as the distance increases, and decreases as the distance decreases.

In some embodiments, the joint inversion system determines confidence of the accuracy of the first inversion (first confidence), and assigns the first fluctuating weight based on the first confidence. Similarly, the joint inversion system also determines confidence of the accuracy of the second inversion (second confidence), and assigns the second fluctuating weight based on the second confidence. In one or more of such embodiments, the first and second confidence are values or functions that increase or decrease as a function of the distance (e.g., from the point of interest to a boundary). For example, the first confidence decreases as the distance from a point of interest of the formation to a boundary increases, and increases as the distance decreases, and the second confidence increases as the distance decreases, and decreases as the distance increases. The joint inversion system merges the first inversion and the second inversion based on the combination of the first fluctuating weight and the second fluctuating weight. More particularly, the joint inversion system merges the first inversion and the second inversion into a combined inversion that is the result of the merger of the first inversion and the second inversion. In some embodiments, where the joint inversion system performs multiple inversions (e.g., three or more inversions), the joint inversion system merges all of the inversions into the combined inversion, where the combined inversion is the result of the merger of all of individual inversions. In some embodiments, the joint inversion system geosteers a logging tool or requests the logging tool to be geosteered based on the results of the combined inversion. Additional descriptions of the foregoing methods to perform joint inversion of formation data and joint inversion systems are described in the paragraphs below and are illustrated in FIGS. 1-6.

Turning now to the figures, FIG. 1 is a schematic, side view of a LWD/MWD environment 150 with a tool 121 deployed to measure the properties of formation 112 during a drilling operation. FIG. may also represent another completion or preparation environment where a drilling operation is performed. A hook 138, cable 142, traveling block (not shown), and hoist (not shown) are provided to lower a drill string 119 down borehole 106 of well 102 or to lift drill string 119 up from borehole 106 of well 102.

At the wellhead 136, an inlet conduit 122 is coupled to a fluid source 152 to provide fluids, such as drilling fluids, downhole. The drill string 119 has an internal cavity that provides a fluid flow path from surface 108 down to tool 121. In some embodiments, the fluids travel down drill string 119, through tool 121, and exit drill string 119 at a drill bit 124. The fluids flow back towards surface 108 through a wellbore annulus 148 and exit the wellbore annulus 148 via an outlet conduit 164 where the fluids are captured in container 140.

In LWD systems, sensors or transducers (not shown) are typically located at the lower end of the drill string 119. In one or more embodiments, sensors employed in LWD applications are built into a cylindrical drill collar that is positioned close to drill bit 124. While drilling is in progress, these sensors continuously or intermittently determine the formation resistivity of the downhole formation proximate to drill bit 124, and transmit the information to a surface detector by one or more telemetry techniques, including, but not limited to mud pulse telemetry, acoustic telemetry, and electromagnetic wave telemetry.

In one or more embodiments, where a mud pulse telemetry system is deployed in borehole 106 to provide telemetry, telemetry information is transmitted by adjusting the timing or frequency of viable pressure pulses in the drilling fluid that is circulated through drill string 119 during drilling operations. In one or more embodiments, an acoustic telemetry system that transmits data via vibrations in the tubing wall of the drill string 119 is deployed in borehole 106 to provide telemetry. More particularly, the vibrations are generated by an acoustic transmitter (not shown) mounted on drill string 119 and propagate along drill string 119 to an acoustic receiver (not shown) also mounted on drill string 119. In one or more embodiments, an electromagnetic wave telemetry system that transmits data using current flows induced in drill string 119 is deployed in borehole 106 to provide telemetry. Additional types of telemetry systems may also be deployed in borehole 106 to transmit data from tool 121 and other downhole components to joint inversion system 184.

Tool 121 is also operable to obtain measurements of the resistivity of the formation 112 and provide data indicative of the formation resistivity to joint inversion system 184. Additional descriptions of the operations performed by tool 121 are provided in the paragraphs below.

In the embodiment of FIG. 1, joint inversion system 184, includes a processor operable to perform inversions of a formation at different frequencies, assign different fluctuating weights to the inversions, and merge the inversions based on a combination of the fluctuating weights assigned to the inversions to generate a joint inversion of the formation. Additional descriptions of the processor and operations performed by the processor are described in the paragraphs below.

Figure 2A:
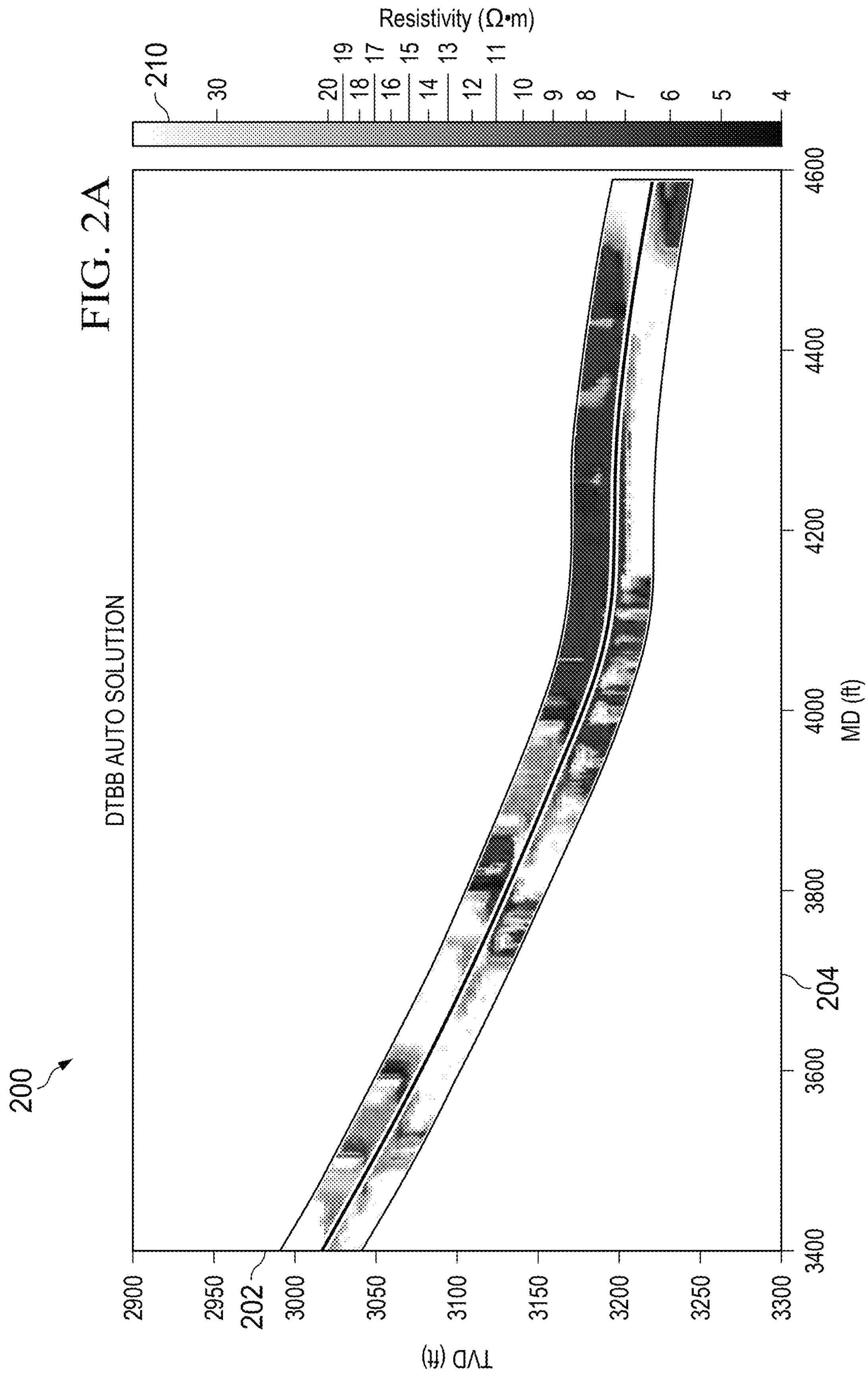
FIG. 2A is a first exemplary image of a first inversion model generated from a logging tool operating at a first frequency.

FIGS. 2A-2D are exemplary images of four inversion models 200, 220, 240, and 260 generated from a logging tool of the joint inversion system operating at different frequencies. In the embodiment of FIG. 2A, axis 202 represents true vertical depth, axis 204 represents measured depth, and spectrum 210 represents a spectrum indicative of different resistivity values. In the embodiment of FIG. 2A, inversion model 200 is generated based on formation data obtained by the logging tool while operating at 125 k and 250 kHz at T-R spacing of 12 ft.

Figure 2B:
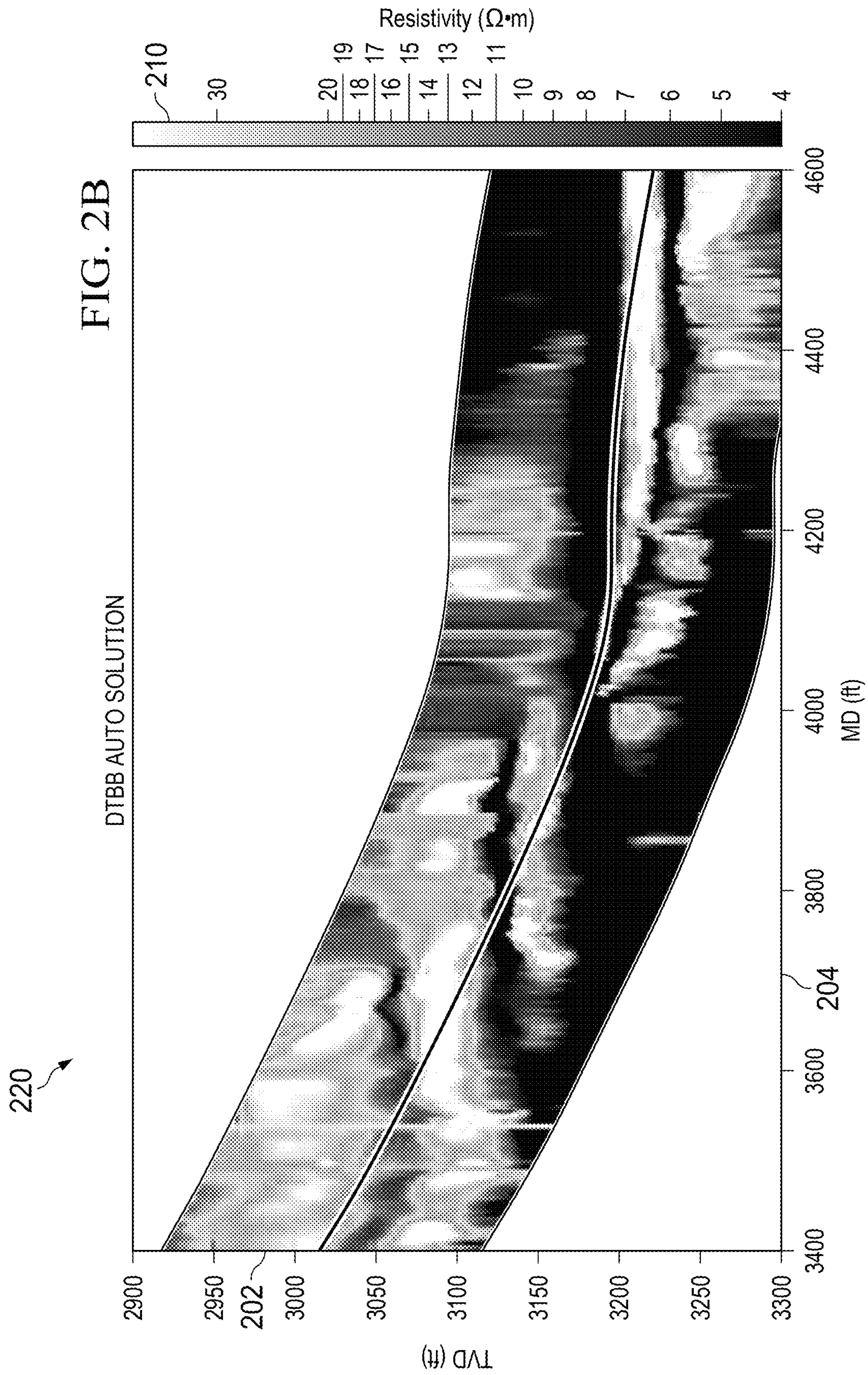
FIG. 2B is a second exemplary image of a second inversion model generated from the logging tool operating at a second frequency.

In the embodiment of FIG. 2B, axis 202 represents true vertical depth, axis 204 represents measured depth, and spectrum 210 represents a spectrum indicative of different resistivity values. Further, inversion model 220 is generated by the logging tool while operating at 8 k and 16 kHz at T-R spacing of 100 ft and 16 k & 32 kHz at T-R spacing of 50 ft.

Figure 2C:
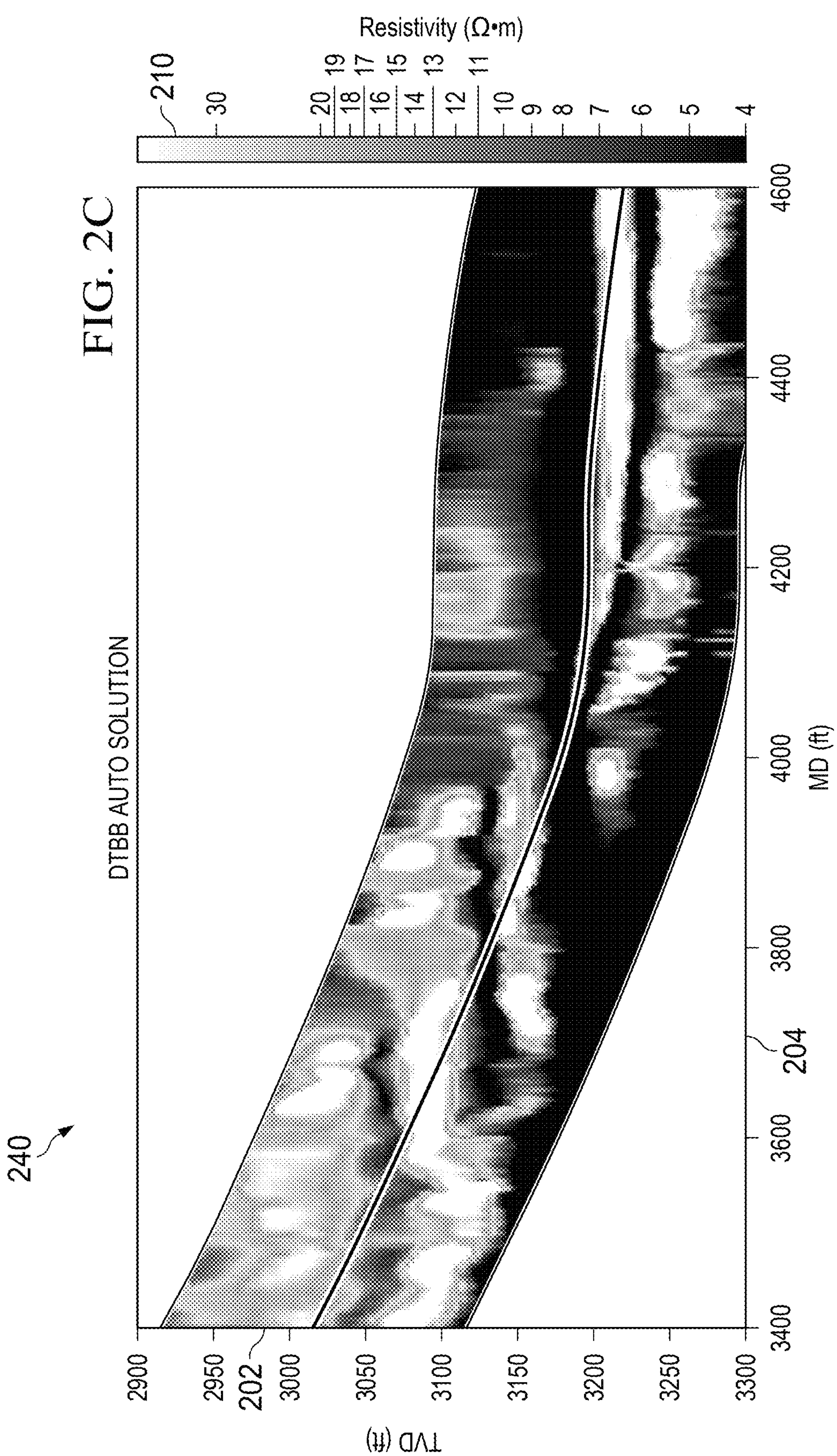
FIG. 2C is a third exemplary image of a third inversion model generated from a logging tool operating at a third frequency.

In the embodiment of FIG. 2C, axis 202 represents true vertical depth, axis 204 represents measured depth, and spectrum 210 represents a spectrum indicative of different resistivity values. Further, inversion model 240 is generated by the logging tool while operating at 4 k and 8 kHz at T-R spacing of 100 ft and 8 k and 16 kHz at T-R spacing of 50 ft.

Figure 2D:
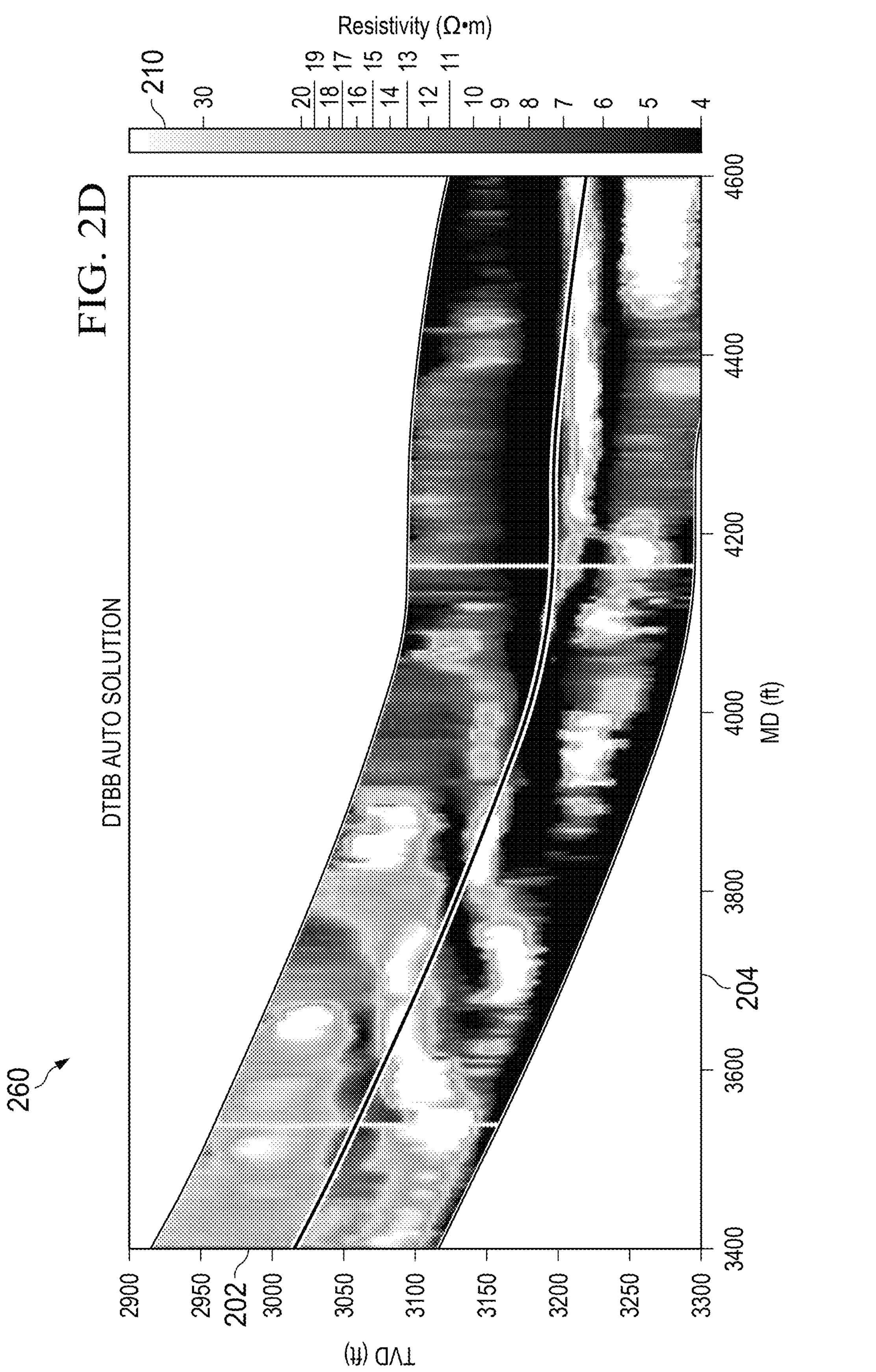
FIG. 2D is a fourth exemplary image of a fourth inversion model generated from a logging tool operating at a fourth frequency.

In the embodiment of FIG. 2D, axis 202 represents true vertical depth, axis 204 represents measured depth, and spectrum 210 represents a spectrum indicative of different resistivity values. Further, inversion model 260 is generated by the logging tool while operating at 2 k and 4 kHz at T-R spacing of 100 ft and 4 k and 8 kHz at T-R spacing of 50 ft. In the embodiment of FIGS. 2A-2D, the tool configuration that obtained formation data used to generate inversion model 260 detects layers further away with more accuracy from the wellbore due to the lower frequency measurements, whereas the tool configuration that obtained formation data used to generate inversion model 220 identifies clear resistivity variations, especially high resistivity variation, near the wellbore due to the higher frequency measurements.

Figure 3:
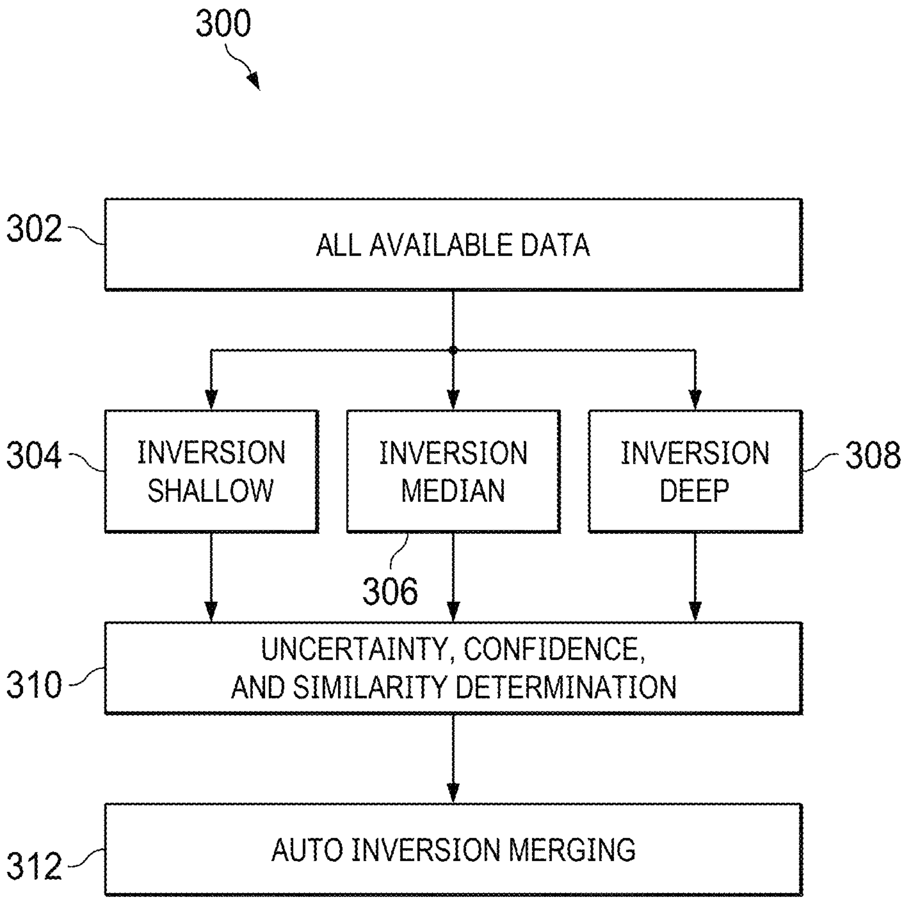
FIG. 3 is a flow chart of a process to perform joint inversion of formation data.

In some embodiments, the joint inversion system performs an individual inversion with related input measurements and formation data to focus on particular formation geological features, and categorizes several sets of inversion input channels into different groups with relatively shallow, median, and deep detection ranges into formations. In one or more of such embodiments, individual inversion is then performed based on each group of measurements. In that regard, FIG. 3 is a flow chart 300 of a process to perform joint inversion of formation data. In the embodiment of FIG. 3, the joint inversion system obtains all available formation data at block 302. At blocks 304, 306, and 308, the joint inversion system performs inversions of shallow, median, and deep distances (e.g., from a boundary). At block 310, the joint inversion system estimates the uncertainty and the confidence zone of each inversion as well as the similarity zone among all the inversion results. The information is then used to calculate weight functions, which will be employed to merge the inversion results. In some embodiments, a Fuzzy Logic toolset is utilized to simplify and automate the design of these weight functions. In one or more of such embodiments, for high confidence area of individual inversion, the joint inversion system applies a higher weight to the inversion results. On the other hand, the joint inversion system applies less weight to the inversion results for the highly uncertain area of the inversion. Once these weight functions are available, the joint inversion system applies the below equation to calculate the combined inversion results:

$$Res_{new}(i,j) = W_s(i,j)Res_{Shallow}(i,j) + W_M(i,j)Res_{Median}(i,j) + W_D(i,j)Res_{Deep}(i,j) \qquad \text{Equation (1)}$$

where, i indicates the measured depth (MD) location of the inversion, j indicates the true vertical depth (TVD) location of the inversion), and $W_S$, $W_M$ and $W_D$ are the weight function for each $Res_{Shallow}$, $Res_{Median}$ and $Res_{Deep}$ based on the confidence of the inversion results from inversion shallow, inversion median and inversion deep. These weight functions should typically be greater than or equal to zero. In some embodiments, such as Equation (1), the summation of all weight functions at every (i,j) is equal to 1: $W_s(i,j)+W_M(i,j)+W_D(i,j)=1$.

In some embodiments, applying Eq. (1), sometimes results from different inversions may have different resolutions. In order to merge them consistently and correctly, the joint inversion system projects low-resolution results into high-resolution results. In one of such embodiments, the joint inversion system utilizes a spatial interpolation method to perform the foregoing operation. In one or more of such embodiments, the joint inversion system implements a normalization or filtering post-processing after interpolation to eliminate errors that may have been introduced during the interpolation. In some embodiments, the joint inversion system applies one of the following equations in lieu of equation 1.

$$Res_{new}(i,j) = Res_{Shallow}(i,j)^{W_s(i,j)} \times Res_{Median}(i,j)^{W_M(i,j)} \times Res_{Deep}(i,j)^{W_D(i,j)})^{\frac{1}{n}} \qquad \text{Equation (2)}$$

where $W_s(i,j)+W_M(i,j)+W_D(i,j)=n$.

$$Res_{new}(i,j) = \frac{1}{\frac{W_s(i,j)}{Res_{Shallow}(i,j)} + \frac{W_M(i,j)}{Res_{Median}(i,j)} + \frac{W_D(i,j)}{Res_{Deep}(i,j)}} \qquad \text{Equation (3)}$$

where $W_s(i,j)+W_M(i,j)+W_D(i,j)=1$.

$$Res_{new}(i,j) = \left(\sigma_{Shallow}(i,j)^{-W_s(i,j)} \times \sigma_{Median}(i,j)^{-W_M(i,j)} \times \sigma_{Deep}(i,j)^{-W_D(i,j)}\right)^{\frac{1}{n}} \quad \text{Equation (4)}$$

where $\sigma_{shallow}$(i,j)=1/$Res_{Shallow}$(i,j), $\sigma_{Median}$(i,j)=1/$Res_{Median}$(i,j), $\sigma_{Deep}$(i,j)=1/$Res_{Deep}$(i,j), and $W_s$(i,j)+$W_M$(i,j)+$W_D$(i,j)=n.

Figure 4A:
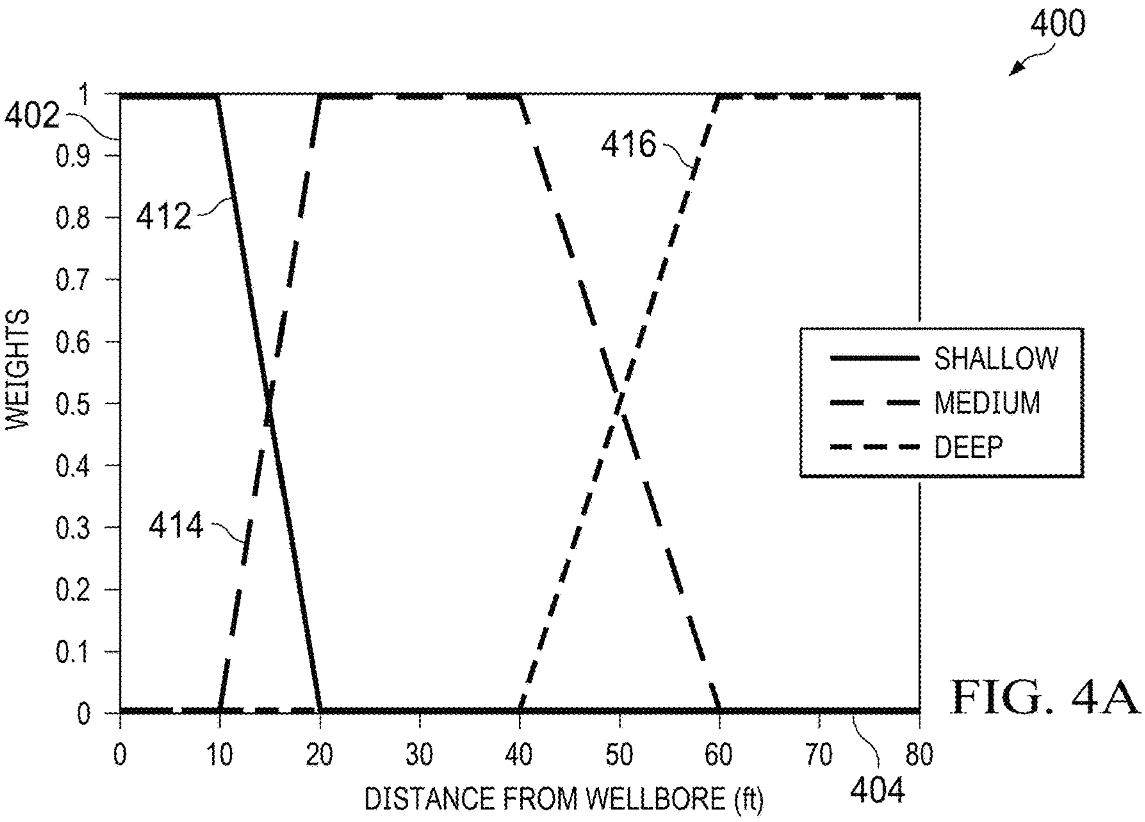
FIG. 4A is a graph of three fluctuating weights applied to three different inversions, where each weight varies based on a distance of a location of interest from the wellbore.
Figure 4B:
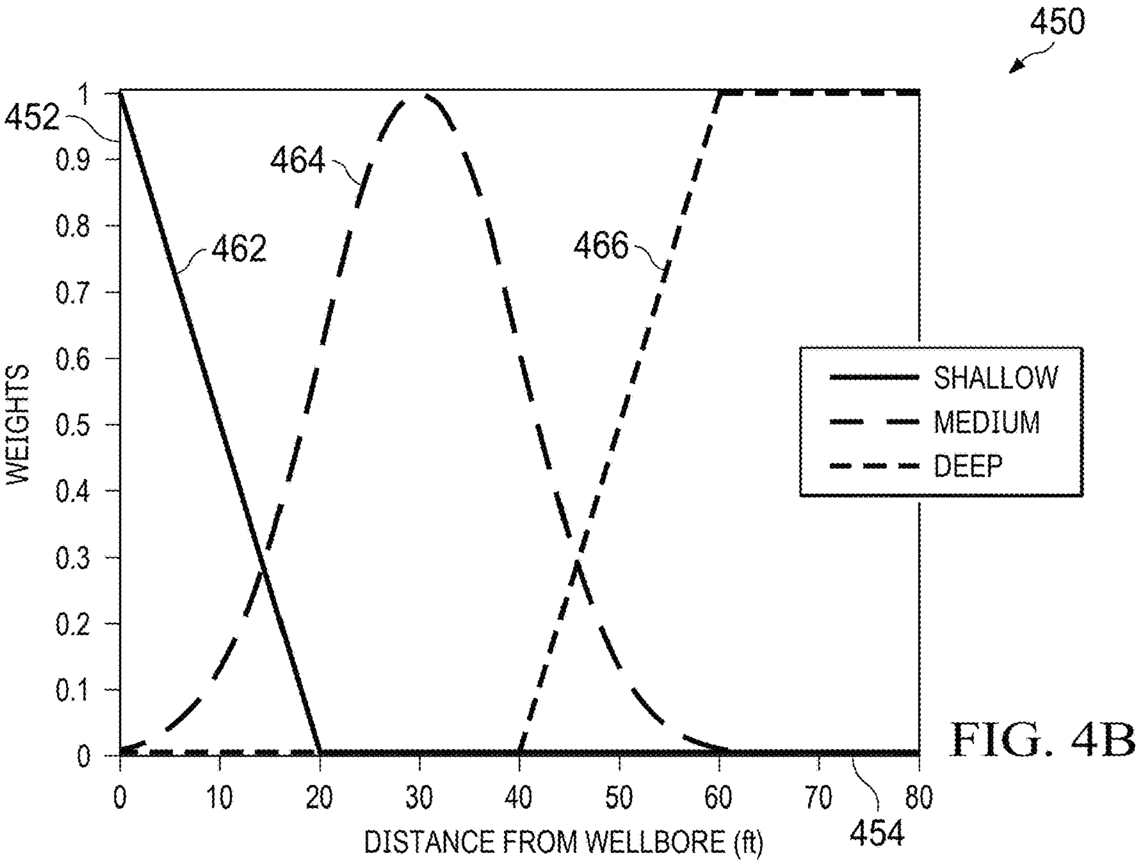
FIG. 4B is another graph of three fluctuating weights applied to three different inversions, where each weight varies based on a distance of a location of interest from the wellbore.

FIG. 4A is a graph 400 of three fluctuating weights applied to three different inversions, where each weight is represented by a corresponding line 412, 414, or 416, and where each weight varies based on a distance of a location of interest from the wellbore. Similarly, FIG. 4B is another graph 450 of three fluctuating weights applied to three different inversions, where each weight is represented by a corresponding line 462, 464, or 466, and where each weight varies based on a distance of a location of interest from the wellbore. Further, in the embodiments of FIGS. 4A and 4B, axis 402 and 452 represent a weighted value (e.g., a value that ranges from 0 to 1), and axis 404 and 454 represent distance from a wellbore. As shown in the embodiments of FIGS. 4A and 4B, the weight applied to each inversion varies based on the distance from the wellbore. In some embodiments, the weighted values of lines 412, 414, 416, 462, 464, and 466 represent the uncertainty of the accuracies of the corresponding inversions at different distances from the point of interest. In some embodiments, the weighted values of lines 412, 414, 416, 462, 464, and 466 represent the confidence of the accuracies of the corresponding inversions at different distances from the point of interest.

In the embodiment of FIG. 4A, the weighted value of a first inversion represented by line 412 is at the maximum value of 1 within 10 feet of the location of interest, and linearly decreases from 10 feet to 20 feet, where the value at 20 feet drops down to 0 and remains at 0 beyond 20 feet from the point of interest. The weighted value of a second inversion represented by line 414 is at 0 from 0-10 feet from the point of interest, linearly increases from 10 feet to 20 feet, where the value at 20 feet is a the maximum of 1, remains at 1 from 20 feet to 40 feet, and linearly decreases from 40 feet to 60 feet, where the value drop down to 0 from 60 feet and remains at 0 beyond 60 feet. The weighted value of a third inversion represented by line 416 is at 0 from 0 feet to 40 feet from the point of interest, linearly increases from 40 feet to 60 feet, where the value is at the maximum of 1 at 60 feet, and remains at 1 beyond 60 feet. In some embodiments, the joint inversion system assigned each of the three inversions a corresponding weighted value (as illustrated in FIG. 4A), and applies the corresponding weighted value when combining the three inversions. For example, at the point of interest, the joint inversion system applies a weighted value of 1 to the first inversion and applies a weighted value of 0 to the second and third inversions, or disregards the second and third inversions. At 15 feet from the point of interest, the joint inversion system applies a weighted value of 0.5 to the first and second inversions, and applies a weighted value of 0 to the third inversion, or disregards the third inversion. At 50 feet from the point of interest, the joint inversion system applies a weighted value of 0.5 to the second and third inversions, and applies a weighted value of 0 to the first inversion, or disregards the first inversion. As such, the weighted value of each inversion relative to the combined inversion differs at different distances from the point of interest.

In the embodiment of FIG. 4B, the weighted value of a first inversion represented by line 462 is at the maximum value of 1 at the location of interest, and linearly decreases from 0 feet to 20 feet, where the value at 20 feet drops down to 0 and remains at 0 beyond 20 feet from the point of interest. The weighted value of a second inversion represented by line 464 is at 0 at the point of interest, takes on a sinusoidal shape as it increases from 0 feet to 30 feet, where the value at 30 feet is a the maximum of 1, takes on another sinusoidal shape as the value decreases from 40 feet to approximately 60 feet, where the value drop down to 0 at approximately 60 feet and remains at 0 beyond 60 feet. The weighted value of a third inversion represented by line 466 is at 0 from 0 feet to 40 feet from the point of interest, linearly increases from 40 feet to 60 feet, where the value is at the maximum of 1 at 60 feet, and remains at 1 beyond 60 feet. In some embodiments, the joint inversion system assigned each of the three inversions a corresponding weighted value (as illustrated in FIG. 4B), and applies the corresponding weighted value when combining the three inversions. For example, at the point of interest, the joint inversion system applies a weighted value of 1 to the first inversion and applies a weighted value of 0 to the second and third inversions, or disregards the second and third inversions. At 30 feet from the point of interest, the joint inversion system applies a weighted value of 1 to the second inversion, and applies a weighted value of 0 to the first and third inversions, or disregards the first and third inversion. At 50 feet from the point of interest, the joint inversion system applies a weighted value of approximately 0.3 to the second and third inversions, and applies a weighted value of 0 to the first inversion, or disregards the first inversion.

Although FIGS. 4A and 4B illustrate the weighted values linearly and sinusoidally changing, in some embodiments, the weighted values change at different rates, and lines corresponding to the weighted values take on different shapes. Further, although FIGS. 4A and 4B illustrate three lines representing three different inversions, in some embodiments, fluctuating values of a different number of weights each assigned to a different inversion are determined and utilized to combine the inversions into a combined inversion.

Figure 5:
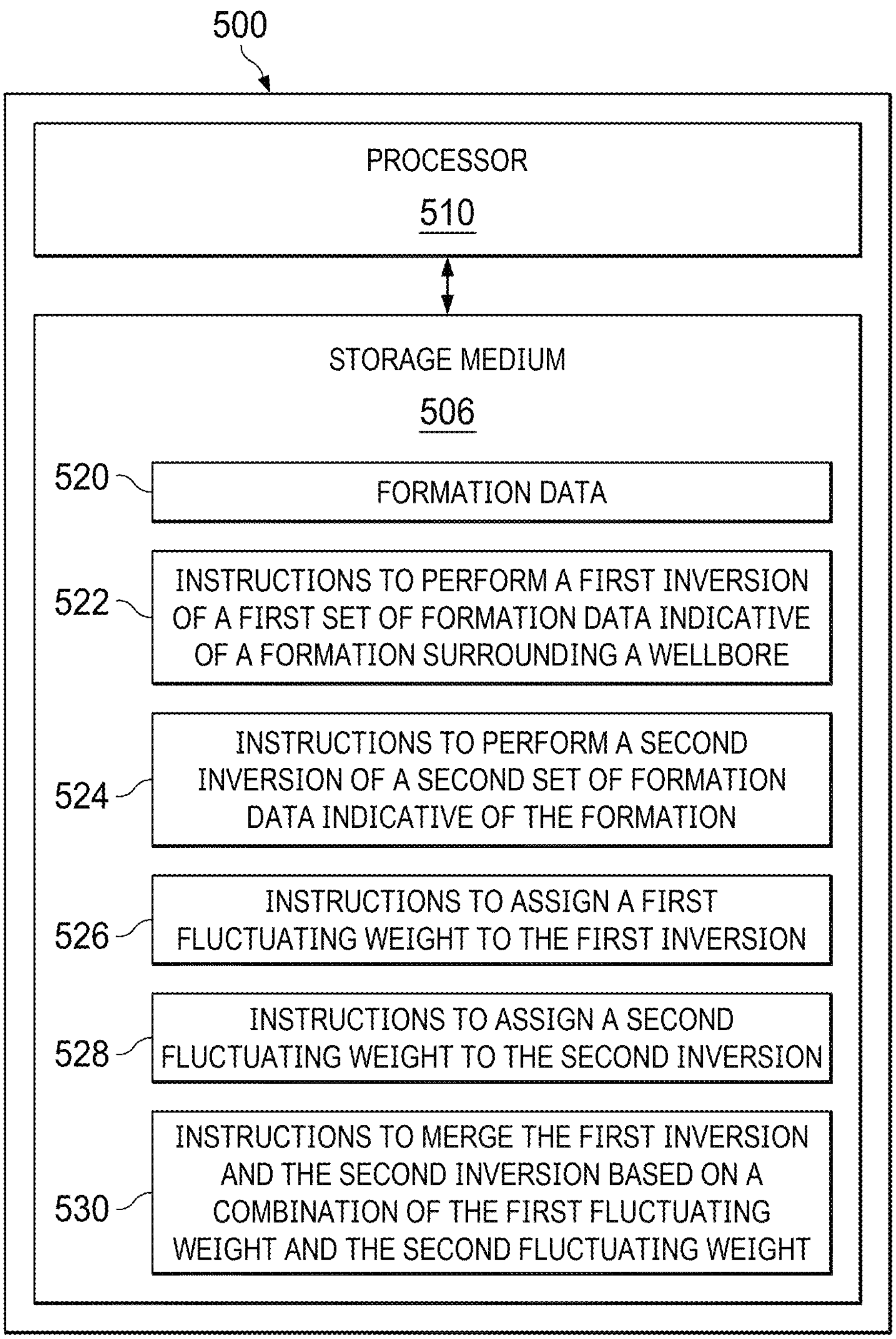
FIG. 5 is a block diagram of the joint inversion system of FIG. 1.
Figure 6:
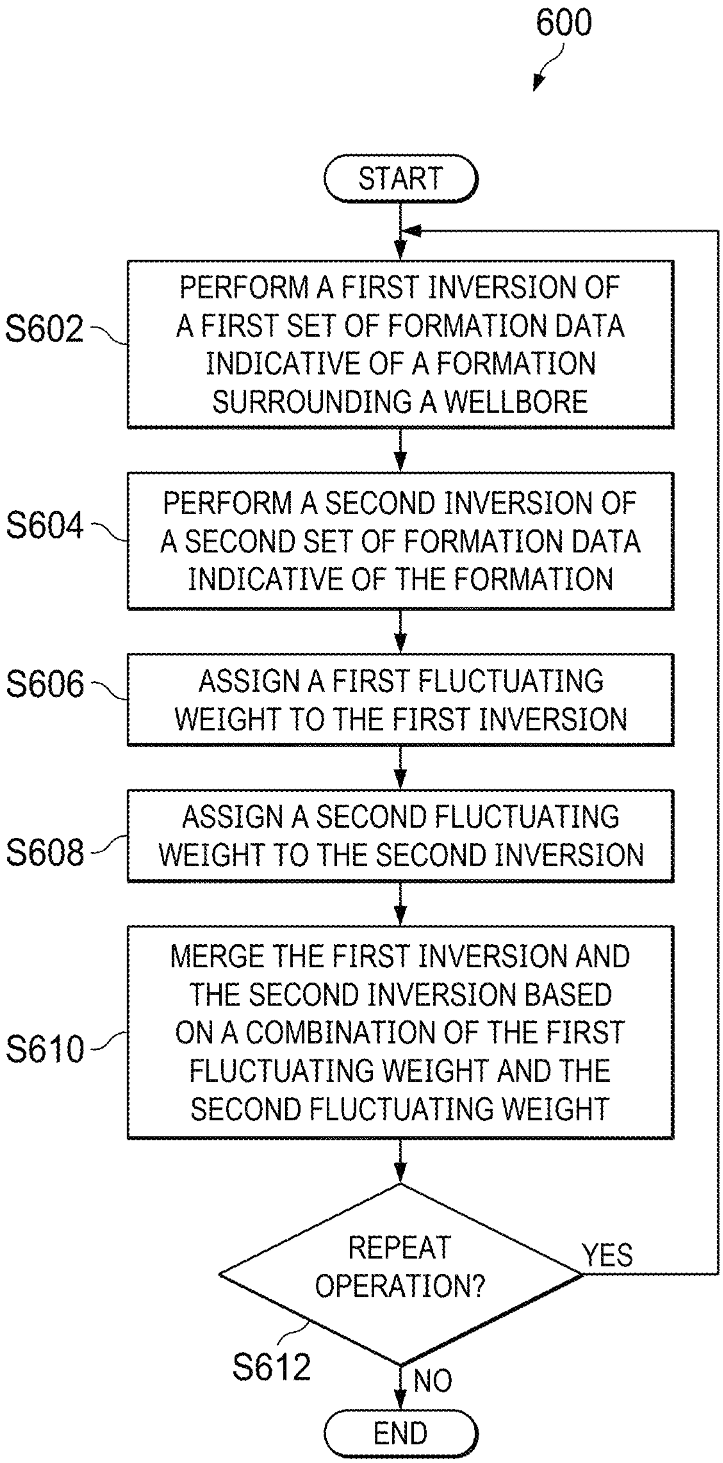
FIG. 6 is a flow chart of a process to perform joint inversion of formation data.

FIG. 5 is a block diagram 500 of the joint inversion system 184 of FIG. 1, and that is configured to perform the operations illustrated in process 600 of FIG. 6. Joint inversion system 500 includes a storage medium 506 and a processor 510. The storage medium 506 may be formed from data storage components such as, but not limited to, read-only memory (ROM), random access memory (RAM), flash memory, magnetic hard drives, solid state hard drives, CD-ROM drives, DVD drives, floppy disk drives, as well as other types of data storage components and devices. In some embodiments, the storage medium 506 includes multiple data storage devices. In further embodiments, the multiple data storage devices may be physically stored at different locations. In one of such embodiments, the data storage devices are components of a server station, such as a cloud server. Formation data is stored at a first location 520 of storage medium 506. Further, instructions to perform a first inversion of a first set of formation data indicative of a formation surrounding a wellbore are stored at a second location 522 of storage medium 506. Further, instructions to perform a second inversion of a second set of formation data indicative of the formation are stored at a third location 524 of storage medium 506. Further, instructions to assign a first fluctuating weight to the first inversion are stored at a fourth location 526 of storage medium 506. Further, instructions to assign a second fluctuating weight to the second inversion are stored at a fifth location 528 of storage medium 506. Further, instructions to merge the first inversion and the second inversion based on a combination of the first fluctuating weight and the second fluctuating weight are stored at a sixth location 530 of storage medium 506.

FIG. 6 is a flow chart of process 600 to perform joint inversion of formation data. Although the operations in process 600 are shown in a particular sequence, certain operations may be performed in different sequences or at the same time where feasible.

At block S602, the joint inversion system performs a first inversion of a first set of formation data indicative of a formation surrounding a wellbore. At block S604, the joint inversion system performs a second inversion of a second set of formation data indicative of the formation. At block S606, the joint inversion system assigns a first fluctuating weight to the first inversion. At block S608, the joint inversion system assigns a second fluctuating weight to the second inversion. At block S610, the joint inversion system merges the first inversion and the second inversion based on a combination of the first fluctuating weight and the second fluctuating weight Process 600 then proceeds to block S612, and the joint inversion system determines whether to re-run operations described herein to perform joint inversion of formation data. Process 600 then returns to block S602 in response to a determination to re-run the operations. Alternatively, process 600 ends (or temporarily ends) in response to a determination not to re-run the operations.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure.

Clause 1, a computer-implemented method to perform joint inversion of formation data, comprising: performing a first inversion of a first set of formation data indicative of a formation surrounding a wellbore, wherein the first set of formation data is obtained by a logging tool acquiring a first set of tool measurements; performing a second inversion of a second set of formation data indicative of the formation, wherein the second set of formation data is obtained by the logging tool acquiring a second set of tool measurements that is different from the first set; assigning a first fluctuating weight to the first inversion; assigning a second fluctuating weight to the second inversion; and merging the first inversion and the second inversion into a combined inversion, the combined inversion being a result of a merger of the first inversion and the second inversion.

Clause 2, the computer-implemented method of clause 1, wherein the first fluctuating weight and the second fluctuating weight at a point of interest of the formation vary based on a distance from the point of interest to a boundary.

Clause 3, the computer-implemented method of clause 2, wherein at least one of a first frequency operated in the first measurement set and a first transmitter-receiver spacing used in the first measurement set is different from a second frequency operated in the second measurement set and a second transmitter-receiver spacing used in the second measurement set, respectively.

Clause 4, the computer-implemented method of clause 3, wherein the first fluctuating weight has a greater value as the distance decreases, and the first fluctuating weight has a lesser value as the distance increases.

Clause 5, the computer-implemented method of clause 4, wherein the second fluctuating weight has a greater value as the distance increases, and the second fluctuating weight has a lesser value as the distance decreases.

Clause 6, the computer-implemented method of any of clauses 1-5, wherein performing the first inversion comprises performing the first inversion at a first transmitter-receiver spacing and a second transmitter-receiver spacing, and wherein performing the second inversion comprises performing the second inversion at the first transmitter-receiver spacing and the second transmitter-receiver spacing.

Clause 7, the computer-implemented method of any of clauses 1-6, further comprising: determining a first uncertainty of the first inversion, wherein assigning the first fluctuating weight comprises assigning the first fluctuating weight based on the first uncertainty; and determining a second uncertainty of the second inversion, wherein assigning the second fluctuating weight comprises assigning the second fluctuating weight based on the second uncertainty.

Clause 8, the computer-implemented method of clause 7, wherein the first uncertainty decreases as a distance from a point of interest of the formation to a boundary decreases, and increases as the distance increases.

Clause 9, the computer-implemented method of clause 8, wherein the second uncertainty increases as the distance increases, and decreases as the distance decreases.

Clause 10, the computer-implemented method of any of clauses 1-9, further comprising: determining a first confidence of the first inversion, wherein assigning the first fluctuating weight comprises assigning the first fluctuating weight based on the first confidence; and determining a second confidence of the second inversion, wherein assigning the second fluctuating weight comprises assigning the second fluctuating weight based on the second confidence.

Clause 11, the computer-implemented method of clause 10, wherein the first confidence decreases as a distance from a point of interest of the formation to a boundary increases, and increases as the distance decreases.

Clause 12, the computer-implemented method of clause 11, wherein the second confidence increases as the distance decreases, and decreases as the distance increases.

Clause 13, the computer-implemented method of any of clauses 1-12, further comprising: performing a third inversion of a third set of formation data indicative of the formation surrounding the wellbore, wherein the third set of formation data is obtained by the logging tool acquiring a third set of tool measurements that is different than the first set of tool measurements and the second set of tool measurements; assigning a third fluctuating weight to the third inversion; and merging the first inversion, the second inversion, and the third inversion into the combined inversion.

Clause 14, the computer-implemented method of clauses 13, further comprising: performing a fourth inversion of a fourth set of formation data indicative of the formation surrounding the wellbore, wherein the fourth set of formation data is obtained by the logging tool acquiring a fourth set of tool measurements that is different from the first set of tool measurements, the second set of tool measurements, and the third set of tool measurements; assigning a fourth fluctuating weight to the fourth inversion; and merging the first inversion, the second inversion, the third inversion, and the fourth inversion into the combined inversion.

Clause 15, the computer-implemented method of any of clauses 1-14, further comprising geosteering the logging tool based on a result of the combined inversion.

Clause 16, a joint inversion system, comprising: storage medium; and one or more processors configured to: perform a first inversion of a first set of formation data indicative of a formation surrounding a wellbore, wherein the first set of formation data is obtained by a logging tool acquiring a first set of tool measurements; perform a second inversion of a second set of formation data indicative of the formation, wherein the second set of formation data is obtained by the logging tool acquiring a second set of tool measurements that is different from the first set; assign a first fluctuating weight to the first inversion; assign a second fluctuating weight to the second inversion; and merge the first inversion and the second inversion into the a third combined inversion, the combined inversion being a result of a merger of the first inversion and the second inversion.

Clause 17, the joint inversion system of clause 16, wherein the first fluctuating weight and the second fluctuating weight at a point of interest of the formation vary based on a distance from the point of interest to a boundary, wherein at least one of a first frequency operated in the first measurement set and a first transmitter-receiver spacing used in the first measurement set is different from a second frequency operated in the second measurement set and a second transmitter-receiver spacing used in the second measurement set, respectively, wherein the first fluctuating weight has a greater value as the distance decreases, and the first fluctuating weight has a lesser value as the distance increases, and wherein the second fluctuating weight has a greater value as the distance increases, and the second fluctuating weight has a lesser value as the distance decreases.

Clause 18, the joint inversion system of clauses 16 or 17, wherein the one or more processors are further configured to: determine a first uncertainty of the first inversion, wherein the first fluctuating weight is assigned based on the first uncertainty; and determine a second uncertainty of the second inversion, wherein the second fluctuating weight is assigned based on the second uncertainty.

Clause 19, a non-transitory computer-readable medium comprising instructions, which when executed by one or more processors, cause the one or more processors to perform operations comprising: performing a first inversion of a first set of formation data indicative of a formation surrounding a wellbore, wherein the first set of formation data is obtained by a logging tool acquiring a first set of tool measurements; performing a second inversion of a second set of formation data indicative of the formation, wherein the second set of formation data is obtained by the logging tool acquiring a second set of tool measurements that is different from the first set; assigning a first fluctuating weight to the first inversion; assigning a second fluctuating weight to the second inversion; and merging the first inversion and the second inversion into a combined inversion, the combined inversion being a result of a merger of the first inversion and the second inversion.

Clause 20, the non-transitory computer-readable medium of clause 19, wherein the first fluctuating weight and the second fluctuating weight at a point of interest of the formation vary based on a distance from the point of interest to a boundary, wherein at least one of a first frequency operated in the first measurement set and a first transmitter-receiver spacing used in the first measurement set is different from a second frequency operated in the second measurement set and a second transmitter-receiver spacing used in the second measurement set, respectively, wherein the first fluctuating weight has a greater value as the distance decreases, and the first fluctuating weight has a lesser value as the distance increases, and wherein the second fluctuating weight has a greater value as the distance increases, and the second fluctuating weight has a lesser value as the distance decreases.

As used herein, the singular forms "a," "an," and "the" are intended to include the plural forms as well, unless the context clearly indicates otherwise. It will be further understood that the terms "comprise" and/or "comprising," when used in this specification and/or in the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:

1. A computer-implemented method to perform joint inversion of formation data, comprising:

performing a first inversion of a first set of formation data indicative of a formation surrounding a wellbore, wherein the first set of formation data is obtained by a logging tool acquiring a first set of tool measurements;

performing a second inversion of a second set of formation data indicative of the formation, wherein the second set of formation data is obtained by the logging tool acquiring a second set of tool measurements that is different from the first set;

assigning a first fluctuating weight to the first inversion;

assigning a second fluctuating weight to the second inversion; and merging the first inversion and the second inversion into a combined inversion, the combined inversion being a result of a merger of the first inversion and the second inversion.

2. The computer-implemented method of claim 1, wherein the first fluctuating weight and the second fluctuating weight at a point of interest of the formation vary based on a distance from the point of interest to a boundary.

3. The computer-implemented method of claim 2, wherein at least one of a first frequency operated in the first measurement set and a first transmitter-receiver spacing used in the first measurement set is different from a second frequency operated in the second measurement set and a second transmitter-receiver spacing used in the second measurement set, respectively.

4. The computer-implemented method of claim 3, wherein the first fluctuating weight has a greater value as the distance decreases, and the first fluctuating weight has a lesser value as the distance increases.

5. The computer-implemented method of claim 4, wherein the second fluctuating weight has a greater value as the distance increases, and the second fluctuating weight has a lesser value as the distance decreases.

6. The computer-implemented method of claim 1, wherein performing the first inversion comprises performing the first inversion at a first transmitter-receiver spacing and a second transmitter-receiver spacing, and wherein performing the second inversion comprises performing the second inversion at the first transmitter-receiver spacing and the second transmitter-receiver spacing.

7. The computer-implemented method of claim 1, further comprising:

determining a first uncertainty of the first inversion, wherein assigning the first fluctuating weight comprises assigning the first fluctuating weight based on the first uncertainty; and determining a second uncertainty of the second inversion, wherein assigning the second fluctuating weight comprises assigning the second fluctuating weight based on the second uncertainty.

8. The computer-implemented method of claim 7, wherein the first uncertainty decreases as a distance from a point of interest of the formation to a boundary decreases, and increases as the distance increases.

9. The computer-implemented method of claim 8, wherein the second uncertainty increases as the distance increases, and decreases as the distance decreases.

10. The computer-implemented method of claim 1, further comprising:

determining a first confidence of the first inversion, wherein assigning the first fluctuating weight comprises assigning the first fluctuating weight based on the first confidence; and determining a second confidence of the second inversion, wherein assigning the second fluctuating weight comprises assigning the second fluctuating weight based on the second confidence.

11. The computer-implemented method of claim 10, wherein the first confidence decreases as a distance from a point of interest of the formation to a boundary increases, and increases as the distance decreases.

12. The computer-implemented method of claim 11, wherein the second confidence increases as the distance decreases, and decreases as the distance increases.

13. The computer-implemented method of claim 1, further comprising:

performing a third inversion of a third set of formation data indicative of the formation surrounding the wellbore, wherein the third set of formation data is obtained by the logging tool acquiring a third set of tool measurements that is different than the first set of tool measurements and the second set of tool measurements;

assigning a third fluctuating weight to the third inversion; and merging the first inversion, the second inversion, and the third inversion into the combined inversion.

14. The computer-implemented method of claim 13, further comprising:

performing a fourth inversion of a fourth set of formation data indicative of the formation surrounding the wellbore, wherein the fourth set of formation data is obtained by the logging tool acquiring a fourth set of tool measurements that is different from the first set of tool measurements, the second set of tool measurements, and the third set of tool measurements;

assigning a fourth fluctuating weight to the fourth inversion; and merging the first inversion, the second inversion, the third inversion, and the fourth inversion into the combined inversion.

15. The computer-implemented method of claim 1, further comprising geosteering the logging tool based on a result of the combined inversion.

16. A joint inversion system, comprising:

storage medium; and one or more processors configured to:

perform a first inversion of a first set of formation data indicative of a formation surrounding a wellbore, wherein the first set of formation data is obtained by a logging tool acquiring a first set of tool measurements;

perform a second inversion of a second set of formation data indicative of the formation, wherein the second set of formation data is obtained by the logging tool acquiring a second set of tool measurements that is different from the first set;

assign a first fluctuating weight to the first inversion;

assign a second fluctuating weight to the second inversion; and merge the first inversion and the second inversion into a third combined inversion, the combined inversion being a result of a merger of the first inversion and the second inversion.

17. The joint inversion system of claim 16, wherein the first fluctuating weight and the second fluctuating weight at a point of interest of the formation vary based on a distance from the point of interest to a boundary, wherein at least one of a first frequency operated in the first measurement set and a first transmitter-receiver spacing used in the first measurement set is different from a second frequency operated in the second measurement set and a second transmitter-receiver spacing used in the second measurement set, respectively, wherein the first fluctuating weight has a greater value as the distance decreases, and the first fluctuating weight has a lesser value as the distance increases, and wherein the second fluctuating weight has a greater value as the distance increases, and the second fluctuating weight has a lesser value as the distance decreases.

18. The joint inversion system of claim 16, wherein the one or more processors are further configured to:

determine a first uncertainty of the first inversion, wherein the first fluctuating weight is assigned based on the first uncertainty; and determine a second uncertainty of the second inversion, wherein the second fluctuating weight is assigned based on the second uncertainty.

19. A non-transitory computer-readable medium comprising instructions, which when executed by one or more processors, cause the one or more processors to perform operations comprising:

performing a first inversion of a first set of formation data indicative of a formation surrounding a wellbore, wherein the first set of formation data is obtained by a logging tool acquiring a first set of tool measurements;

performing a second inversion of a second set of formation data indicative of the formation, wherein the second set of formation data is obtained by the logging tool acquiring a second set of tool measurements that is different from the first set;

assigning a first fluctuating weight to the first inversion;

assigning a second fluctuating weight to the second inversion; and merging the first inversion and the second inversion into a combined inversion, the combined inversion being a result of a merger of the first inversion and the second inversion.

20. The non-transitory computer-readable medium of claim 19, wherein the first fluctuating weight and the second fluctuating weight at a point of interest of the formation vary based on a distance from the point of interest to a boundary, wherein at least one of a first frequency operated in the first measurement set and a first transmitter-receiver spacing used in the first measurement set is different from a second frequency operated in the second measurement set and a second transmitter-receiver spacing used in the second measurement set, respectively, wherein the first fluctuating weight has a greater value as the distance decreases, and the first fluctuating weight has a lesser value as the distance increases, and wherein the second fluctuating weight has a greater value as the distance increases, and the second fluctuating weight has a lesser value as the distance decreases.

* * * * *